United States Patent
Vaello Paños et al.

(10) Patent No.: US 12,523,771 B2
(45) Date of Patent: Jan. 13, 2026

(54) PATTERNED ILLUMINATION FOR THREE DIMENSIONAL IMAGING

(71) Applicant: ams International AG, Jona (CH)

(72) Inventors: Miguel Bruno Vaello Paños, Eindhoven (NL); David Stoppa, Eindhoven (NL); Stephan Beer, Eindhoven (NL); Thomas Jessenig, Eindhoven (NL)

(73) Assignee: ams International AG, Jona (CH)

( * ) Notice: Subject to any disclaimer, the term of this patent is extended or adjusted under 35 U.S.C. 154(b) by 1095 days.

(21) Appl. No.: 17/299,441

(22) PCT Filed: Dec. 3, 2019

(86) PCT No.: PCT/EP2019/083421
§ 371 (c)(1),
(2) Date: Jun. 3, 2021

(87) PCT Pub. No.: WO2020/115017
PCT Pub. Date: Jun. 11, 2020

(65) Prior Publication Data
US 2022/0026574 A1  Jan. 27, 2022
US 2023/0258809 A9  Aug. 17, 2023

Related U.S. Application Data

(60) Provisional application No. 62/857,974, filed on Jun. 6, 2019, provisional application No. 62/775,024, filed on Dec. 4, 2018.

(51) Int. Cl.
*G01S 17/894* (2020.01)
*G01S 7/4863* (2020.01)
(Continued)

(52) U.S. Cl.
CPC .......... *G01S 17/894* (2020.01); *G01S 7/4863* (2013.01); *G01S 7/497* (2013.01); *G06V 10/141* (2022.01);
(Continued)

(58) Field of Classification Search
CPC ... G01S 7/4863; G01S 17/894; G06V 10/141; G06V 20/647
See application file for complete search history.

(56) References Cited

U.S. PATENT DOCUMENTS

2012/0293625 A1  11/2012  Schneider et al.
2015/0285625 A1  10/2015  Deane
(Continued)

FOREIGN PATENT DOCUMENTS

CN  102316282 A  1/2012
CN  105100780 A  11/2015
(Continued)

OTHER PUBLICATIONS

Second Office Action issued in the corresponding Chinese patent application No. 201980080414.0, dated Jan. 31, 2024, 24 pages (including 11 pages English translation) (for informational purposes only).

(Continued)

*Primary Examiner* — Yuqing Xiao
*Assistant Examiner* — Zhengqing Qi
(74) *Attorney, Agent, or Firm* — VIERING, JENTSCHURA & PARTNER mbB

(57) ABSTRACT

A method of operating a time-of-flight system includes projecting a light pattern from an illumination source into an environment; by an array of light sensors of a time-of-flight sensor of the time-of-flight system, detecting the light pattern reflected by an object in an environment; and generating a signal based on the light detected by a subset of the light (Continued)

sensors of the array of light sensors, the signal being provided to one or more processors for generation of a representation of the environment.

19 Claims, 10 Drawing Sheets

(51) Int. Cl.
    *G01S 7/497*     (2006.01)
    *G06V 10/141*     (2022.01)
    *G06V 20/64*     (2022.01)
    *G06V 20/58*     (2022.01)
    *G06V 40/16*     (2022.01)

(52) U.S. Cl.
    CPC ............ *G06V 20/647* (2022.01); *G06V 20/58* (2022.01); *G06V 40/172* (2022.01); *G06V 2201/121* (2022.01)

(56) References Cited

U.S. PATENT DOCUMENTS

| | | |
|---|---|---|
| 2015/0334371 A1 | 11/2015 | Galera et al. |
| 2016/0041264 A1 | 2/2016 | Dielacher et al. |
| 2016/0061941 A1 | 3/2016 | Guo et al. |
| 2016/0182891 A1 | 6/2016 | Ko |
| 2017/0176579 A1* | 6/2017 | Niclass ................... G01S 17/10 |
| 2017/0180654 A1 | 6/2017 | Swaminathan et al. |
| 2017/0180658 A1 | 6/2017 | Choi et al. |
| 2018/0259645 A1* | 9/2018 | Shu ......................... G01S 7/497 |
| 2019/0011556 A1* | 1/2019 | Pacala ................... G01S 7/4815 |
| 2019/0056497 A1* | 2/2019 | Pacala ................... G01S 7/4863 |
| 2019/0095806 A1 | 3/2019 | Canedo et al. |
| 2019/0139182 A1 | 5/2019 | Nurvitadhi et al. |
| 2019/0310375 A1* | 10/2019 | Finkelstein ............. G01S 7/484 |
| 2020/0158838 A1* | 5/2020 | Henderson ............ G01S 7/4815 |
| 2021/0080548 A1* | 3/2021 | Beuschel .............. G01S 7/4815 |

FOREIGN PATENT DOCUMENTS

| | | |
|---|---|---|
| CN | 105372667 A | 3/2016 |
| CN | 105763788 A | 7/2016 |
| CN | 106574964 A | 4/2017 |
| CN | 108254158 A | 7/2018 |
| WO | 2018091970 A1 | 5/2018 |

OTHER PUBLICATIONS

Search report issued for corresponding Chinese patent application No. 201980080414.0, dated Jul. 22, 2023, 3 pages (for informational purposes only).

International Search Report issued for the corresponding International Application No. PCT/US2020/36265, dated Aug. 19, 2020, 2 pages (for informational purposes only).

International Search Report for Application No. PCT/EP2019/083421 dated Feb. 28, 2020.

\* cited by examiner

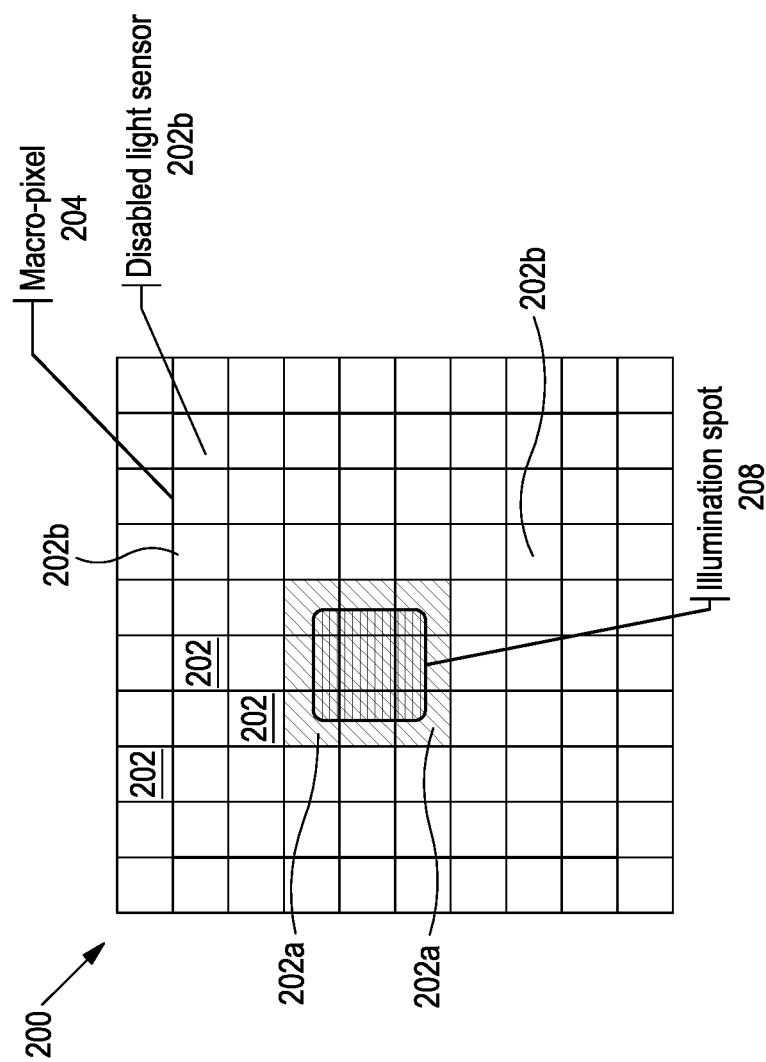

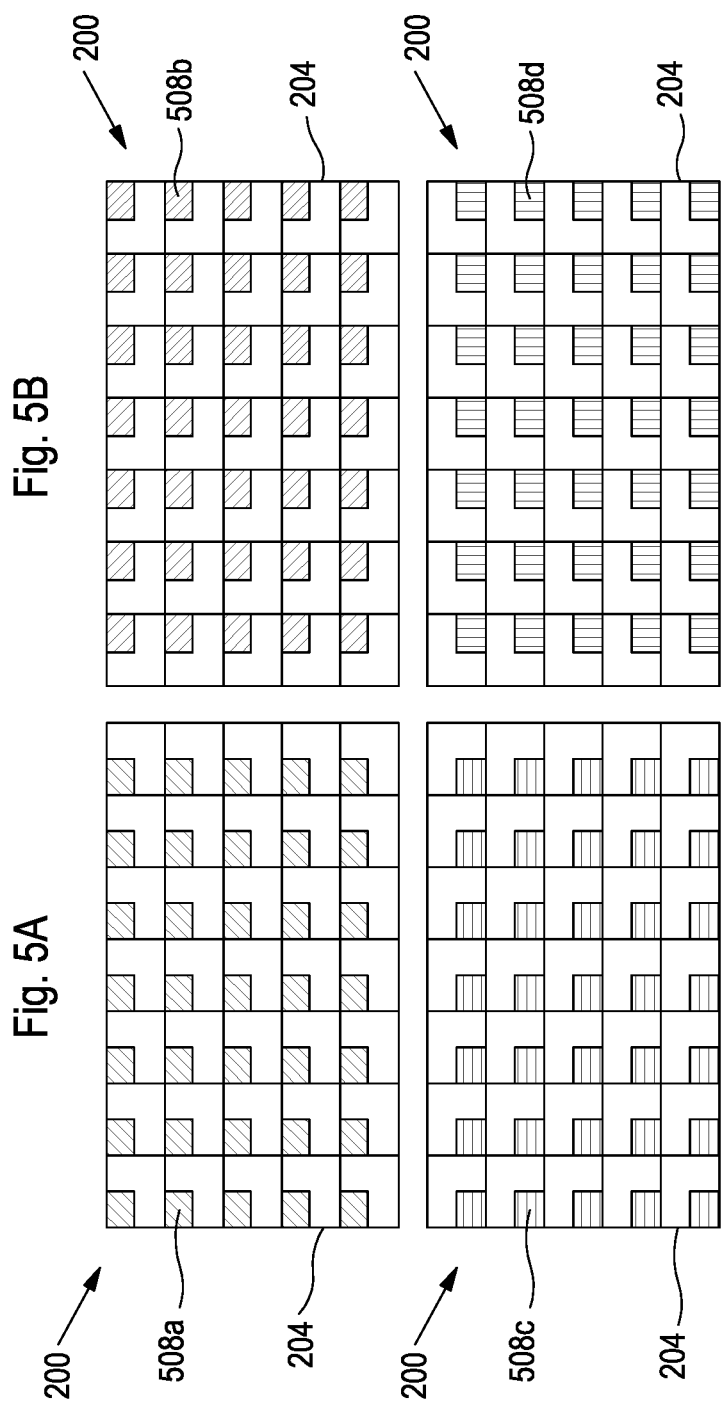

PATTERNED ILLUMINATION FOR THREE DIMENSIONAL IMAGING

RELATED APPLICATIONS

The present invention is a U.S. National Stage under 35 USC 371 patent application, claiming priority to Ser. No. PCT/EP2019/083421, filed on 3 Dec. 2019; which claims priority of U.S. Provisional Application Ser. No. 62/775,024, filed on 4 Dec. 2018; and U.S. Provisional Application Ser. No. 62/857,974 dated 6 Jun. 2019, the entirety of which are incorporated herein by reference.

BACKGROUND

Three-dimensional (3D) imaging enables a depth representation of a scene to be captured. 3D sensing systems, such as time-of-flight (ToF) systems, employ an illumination source, e.g., in the infrared, and a sensor. The illumination source of a 3D sensing system can be a modulated illumination source with dedicated pixels, such as lock-in pixels or single photon avalanche diodes. The modulation frequency or pulse length for the illumination can depend on factors such as the distance range and the desired precision of the resulting image, and can range as high as several hundred megahertz (for the modulation frequency) or as short as several picoseconds (for the pulse length).

SUMMARY

In an aspect, a method of operating a time-of-flight system includes projecting a light pattern from an illumination source into an environment; by an array of light sensors of a time-of-flight sensor of the time-of-flight system, detecting the light pattern reflected by an object in an environment; and generating a signal based on the light detected by a subset of the light sensors of the array of light sensors, the signal being provided to one or more processors for generation of a representation of the environment.

Embodiments can include any one or more of the following features.

The method includes activating the light sensors of the subset of light sensors. The method includes disabling the light sensors of the array of light sensors that are not included in the subset of the light sensors. The array of light sensors is grouped into macropixels, each macropixel including one or more of the activated light sensors, and in which generating the signal comprises generating a signal corresponding to each macropixel based on the light detected by the activated light sensors of the macropixel. Generating a signal corresponding to each macropixel comprises integrating a light signal based on the light detected by the activated light sensors of the macropixel over at least some of the light sensors of the macropixel. Activating a subset of the light sensors of the array of light sensors comprises sequentially activating subsets of light sensors in different macropixels. The method includes activating each subset of the light sensors based on a corresponding light pattern generated by an illumination device. The method includes defining the macropixels based on light detected by the array of light sensors. The method includes calibrating the array of light sensors, including defining each macropixel based on an alignment with a corresponding element of the light pattern.

Activating a subset of the light sensors of the array of light sensors comprises sequentially activating each of multiple subsets of light sensors of the array of light sensors. The method includes activating each subset of the light sensors within each macropixel based on a corresponding light pattern from the illumination device. The sequential activation of each of the multiple subsets of light sensors causes activation of all of the light sensors of the array of light sensors.

Projecting a light pattern comprises sequentially projecting multiple distinct light patterns from the illumination source. The multiple distinct light patterns together correspond to flood illumination of the environment.

Projecting the light pattern comprises projecting multiple light patterns using a multiple emitter or a segmented emitter. The method includes generating the light pattern by at least one of a diffractive element, a patterned mask, a micro-lens array, and direct projection.

The method includes calibrating the imaging sensor, comprising identifying the subset of the light sensors for activation. Identifying the subset of the light sensors for activation comprises identifying the light sensors that detect light having an intensity exceeding a threshold.

In an aspect, a time of flight sensor for a time-of-flight sensor system includes an illumination source configured to project a light pattern into an environment; an array of light sensors each configured to detect light reflected from an object in the environment; and control circuitry configured to: activate a subset of the light sensors of the array of light sensors based on the pattern of illumination light; receive signals from the subset of activated light sensors, the received signals indicative of detection of light reflected from an object in an environment; and generate an output signal based on the signals indicative of detection of light, the signals being provided to one or more processors for generation of a three-dimensional image of the environment.

Embodiments can include any one or more of the following features.

The array of light sensors is grouped into macropixels, each macropixel including one or more of the activated light sensors, and in which generating the output signal comprises generating an output signal corresponding to each macropixel based on the signals indicative of detection of light. The control circuitry is configured to sequentially activate subsets of light sensors in different macropixels.

The control circuitry is configured to sequentially activate each of multiple subsets of the light sensors of the array of light sensors.

The subset of light sensors has an arrangement that corresponds with the pattern of illumination light from the illumination device.

The system includes at least one of a diffractive element, a patterned mark, and a micro-lens array configured to generate the illumination pattern.

The approaches described here can have one or more of the following advantages. The use of patterned illumination light, e.g., sparse light patterns, in active 3D systems, such as time-of-flight systems, can allow the systems to operate with low power consumption. The concentration of optical power into a pattern can lead to enhanced precision of the system. The concentration of optical power into a pattern can improve the ambient light resilience of the system, contributing to high signal-to-noise ratios, or can be used to lower the power consumption of the system.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A and 2B are diagrams of a pixel array of an imaging sensor.

FIGS. 5A-5D are diagrams of a pixel array of an imaging sensor.

Like reference symbols in the various drawings indicate like elements.

DETAILED DESCRIPTION

We describe here a 3D sensor system that employs a sparse light pattern for time-of-flight sensing. Instead of spreading the available optical power in the system uniformly across an imaging sensor of the system, the use of patterned illumination light enables the optical power density of the illuminated areas to be increased. The pixels in the areas where the optical power is incident are active and generate a signal that can be used for image generation. The concentration of optical power into only certain areas, and the corresponding increase in optical power density, can contribute to an enhanced signal-to-noise ratio achievable by the 3D sensor system, which in turn can enhance the precision and ambient light resilience of the 3D sensor system. In some examples, other pixels on which optical power is not incident are disabled, which can contribute to a reduction in power consumption of the 3D sensor system.

Figure 1:
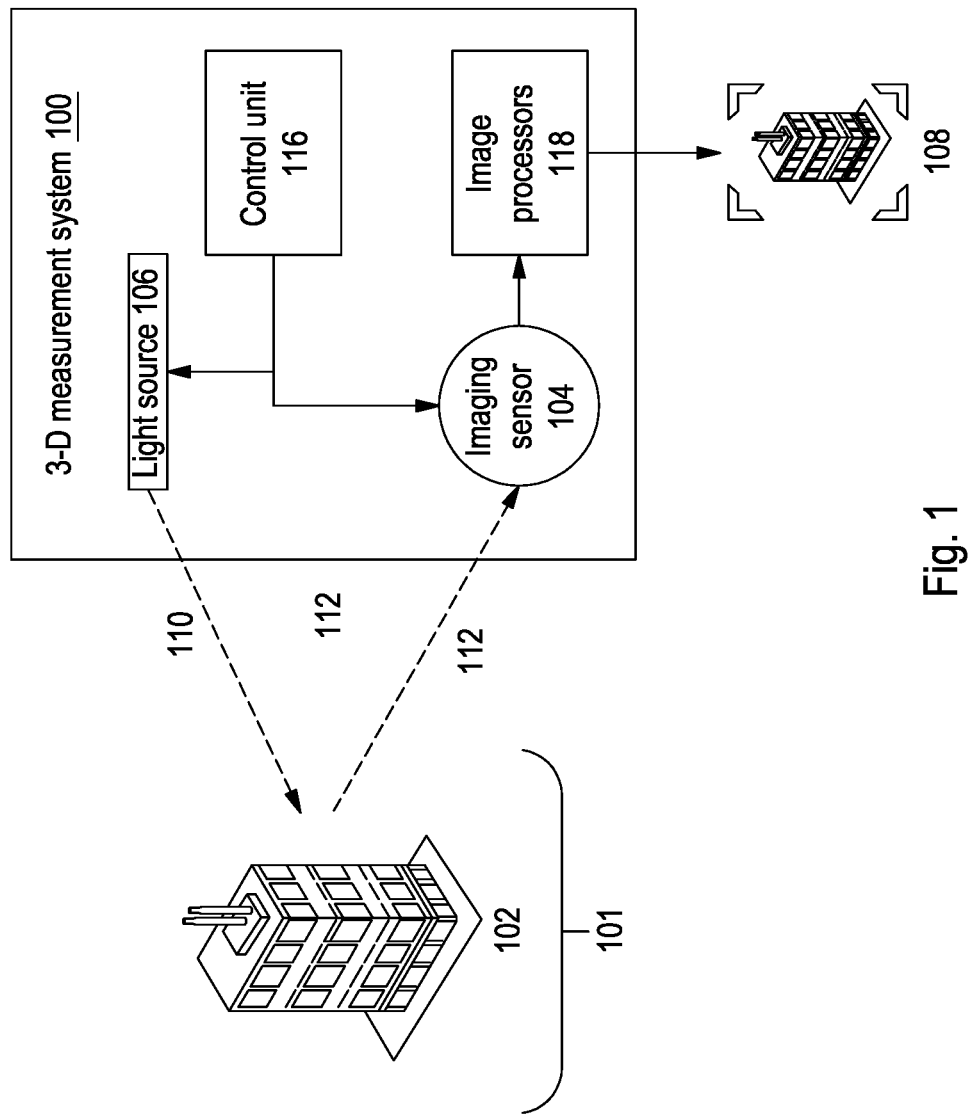
FIG. 1 is a diagram of a 3D sensor system.

Referring to FIG. 1, an example 3D sensor system 100 employs time-of-flight sensing to generate a 3D representation 108, e.g., a 3D image, of an object 102 (in this example, a building) in an environment 101 of the 3D sensor system 100. The 3D sensor system 100 includes an imaging sensor 104 that includes an array (e.g., a two-dimensional (2D) array) of pixels.

The object 102 is illuminated with modulated illumination light 110 from a light source 106, such as a laser. For instance, the light 110 can be infrared (IR) light. Some of the illumination light is reflected by the object 102. The reflected light 112 is detected by the imaging sensor 104.

Each pixel of the imaging sensor 104 is capable of detecting time-related information in the received light signal 112. For an indirect TOF system, the time-related information can be phase information, while for a direct TOF system the time at which the light signal 112 is received is detected. The time-related information detected by the pixels of the imaging sensor can be used to calculate the time of flight of the light signal, which can be converted to distance information R for corresponding points in the environment 101, e.g., points on the object 102. A control unit 116 is configured to regulate the timing of the imaging sensor 104. The distance information from the pixels, in combination with an intensity image of the environment obtained by the imaging sensor 104, are converted into the 3D image 108 of the environment 101 by one or more image processors 118. The image 108 can be displayed to a user, e.g., on a display of a computing device such as a mobile device, or can be used as a machine vision input.

The distance information R for each pixel can be calculated as:

$$R = \frac{c \cdot ToF}{2},$$

where c is the speed of light and ToF is the time of flight, which is the elapsed time between emission of light 111 from the light source 106 and detection of the reflected light 112 by the imaging sensor 104. With each pixel being capable of detecting the reflected light concurrently, the imaging sensor 104 can deliver 3D images in substantially real time, e.g., frame rates greater than 30 Hz.

In some examples, the modulated illumination light can be pulse intensity modulated light, and the demodulation of the reflected light can deliver the time of flight value directly. In some examples, the modulated illumination light can be continuously intensity modulated light, and the demodulation of the reflected light can deliver the phase delay (P) between the emitted light and the reflected light. The phase delay corresponds to the distance R as follows:

$$R = \frac{P \cdot c}{4\pi f_{mod}},$$

where $f_{mod}$ is the modulation frequency of the illumination light, which can range from, e.g., a few MHz up to several hundred MHz.

Light from the illumination device can be patterned, e.g., in a pattern of dots, lines, or other elements, such that less than the entire field of view of the illumination device is illuminated concurrently. For instance, with an light pattern, the illumination can be is discontinuous across the field of view of the illumination device. We sometimes refer to an light pattern composed of a pattern of elements that illuminate less than the entire field of view as a sparse light pattern.

In some examples, the pixels (sometimes referred to just as pixels) of the imaging sensor are activated based on the light pattern, e.g., such that pixels on which the reflected light pattern is incident are active and pixels on which the reflected pattern is not incident are disabled. An active pixel detects light incident on the pixel and generates a signal based on the incident light. A disabled pixels does not receive power, meaning that a disabled pixel does not consume energy or generate a signal even when light is incident on the pixel. In some examples, all pixels are activated, and signal is generated only by those pixels on which the reflected light pattern is incident. By disabling some of the pixels of the array, the power consumption of the imaging sensor can be reduced, resulting in more power efficient operation.

The use of sparse illumination during time-of-flight sensing can contribute to improved system performance and can reduce the power consumption of the sensor system. System performance can be characterized by distance accuracy, resilience to ambient light, signal-to-noise ratio, or other characteristics. These characteristics depend on the amount of active illumination (meaning reflected light originating from the light source 106, as opposed to ambient light) collected by the pixels of the sensor relative to the amount of noise (meaning noise generated by the active illumination, ambient light, or both) collected by the pixels. In a sparse light pattern, the light pattern is output with the same amount of optical power as would a uniform illumination across the entire field of view. As a result, the same amount of optical power is concentrated into the light pattern rather than being spread uniformly across the field of view, thereby increasing the optical power density that is incident on the pixels. In some examples, this increase in optical power density can result in an enhanced signal-to-noise ratio, which can contribute to improved distance accuracy and resilience to ambient light. In some examples, the increase in optical power density can be leveraged to lower the power consumption of the sensor system. In some examples, a 3D representation of the environment resulting from sparse illumination can be a pixelated image, e.g., a sparse depth map of the environment.

Figure 2B:
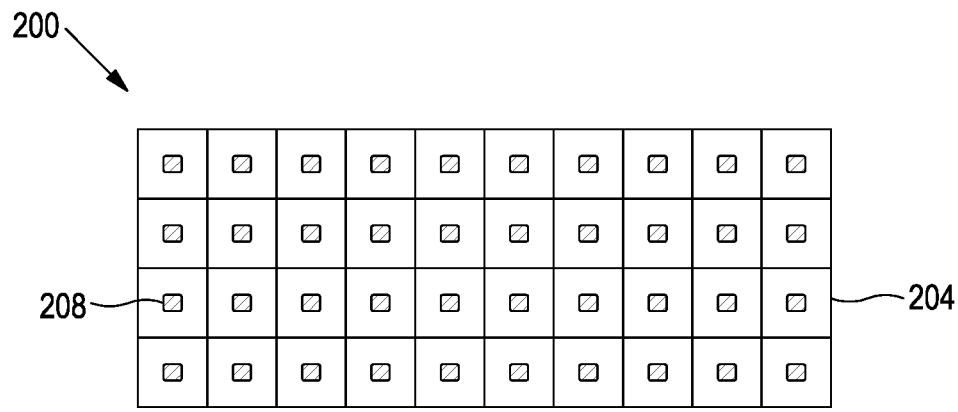

FIGS. 2A and 2B show a portion of an example pixel array 200 of an imaging sensor of a 3D sensor system that uses patterned illumination. The pixel array 200 can be positioned at a focal plane of the light reflected from the environment of the 3D sensor system. The pixel array 200 includes pixels 202, each of which includes a light sensor, such as a semiconductor based photodetector or photodiode.

A light pattern composed of an array of pattern elements, such as a sparse light pattern, is reflected by the environment and is incident on a subset of pixels 202a (shown in shaded gray in FIG. 2A) that are aligned with the illuminated areas of the light pattern. In the example of FIGS. 2A and 2B, the pattern elements of the light pattern are dots 208. Each pixels 202 on which a pattern element is incident generates a signal based on the light, e.g., signals that can be processed to generate a 3D representation (e.g., a 3D image) of the environment. Other pixels 202b of the pixel array 200 are not aligned with the pattern elements, meaning that reflected light of the light pattern is not incident on these pixels 202b.

In the example of FIGS. 2A and 2B, the pixels 202a that are aligned with the pattern elements (e.g., the dots) are active, and the pixels 202b that are not aligned with the pattern elements are disabled. By disabling the pixels 202b that are not aligned with the pattern elements, the imaging sensor can be operated in a power efficient manner, e.g., because the disabled pixels 202b do not perform demodulation processes. Disabling the pixels 202b that are not aligned with the pattern elements can enhance the signal-to-noise ratio of the imaging sensor, because ambient light incident on these disabled pixels 202b is not used in signal generation. In some examples, all pixels are active, and only signals from the pixels 202a that are aligned with the pattern elements are used for generation of a 3D representation.

In the example pixel array 200 shown in FIGS. 2A and 2B, the pixel array 200 is divided into macropixels 204. A macropixel is a set of multiple pixels 202 that correspond to a single point in the 3D representation generated based on the signals from the pixel array 200, e.g., a single pixel in the 3D image. For instance, macropixels can be defined to provide redundancy of pixels, e.g., to reduce optical demands or to ease mechanical alignment constraints. In some examples, macropixels 204 can be defined such that each pattern element of the light pattern (e.g., each dot 208) is centered on a corresponding macropixel 204. A subset of the pixels 202 in each macropixel are active, e.g., the pixels 202a on which the pattern elements are incident. A signal can be generated for each macropixel 204 based on the light incident on the set of pixels 202 in the macropixel 204, e.g., by integrating the signal from each of the constituent pixels 202 of the macropixel 204. In the example of FIGS. 2A and 2B, a pattern of dots 208 is incident on the pixel array 200 such that one dot 208 is incident substantially in the center of each macropixel 204. All of the dots 208 of the light pattern are incident concurrently on the pixel array 200, and signals are generated concurrently by each of the macropixels 204 of the array 200.

In some examples, macropixels 204 can be defined dynamically during a calibration process, e.g., such that the pattern elements (e.g., dots) are centered in the corresponding macropixels. For instance, in a calibration process, all pixels in the pixel array can be active initially. The pixels on which a pattern element is incident that receive light from the light pattern are activated; those that do not are disabled. The macropixels can then be defined, e.g., such that the active pixels are positioned in the center of each macropixel. In some examples, macropixel definitions can be saved, e.g., in the memory of the control unit, such that calibration need not be repeated for every operation of the sensor system.

The patterned illumination light can be generated by any of a variety of approaches. In some examples, the light pattern can be generated by multiple individual emitters, such as individual vertical cavity surface emitting lasers (VCSELs). In some examples, the light pattern can be generated by an optical element that receives light from a light source and generates the light pattern. In some cases, the optical element can include a diffractive optical element that multiplies an light pattern emitted by the light source.

In some examples, the use of an light pattern can be implemented using a scanning technique. For instance, the light pattern can be composed of multiple sub-patterns that are emitted sequentially. Each sub-pattern of an light pattern can impinge on a different subset of pixels of the array of pixels, such that different subsets of the pixels are activated sequentially corresponding to the sequence of sub-patterns. Because the total available optical power is used to illuminate only a fraction of the light pattern for each step in the sequence, the optical power for each element of each sub-pattern is increased, enhancing the performance of the sensor (e.g., one or more of the distance accuracy, signal-to-noise ratio, and resilience to ambient light).

Figure 3A:
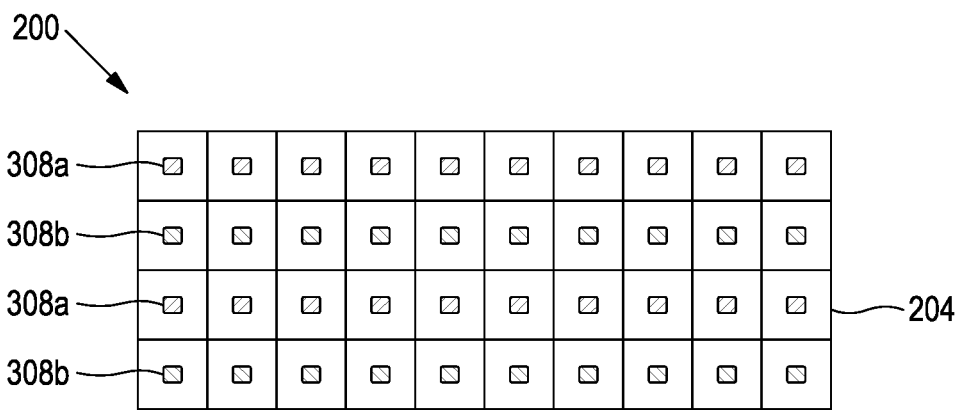
FIGS. 3A and 3B are diagrams of a pixel array of an imaging sensor.
Figure 3B:
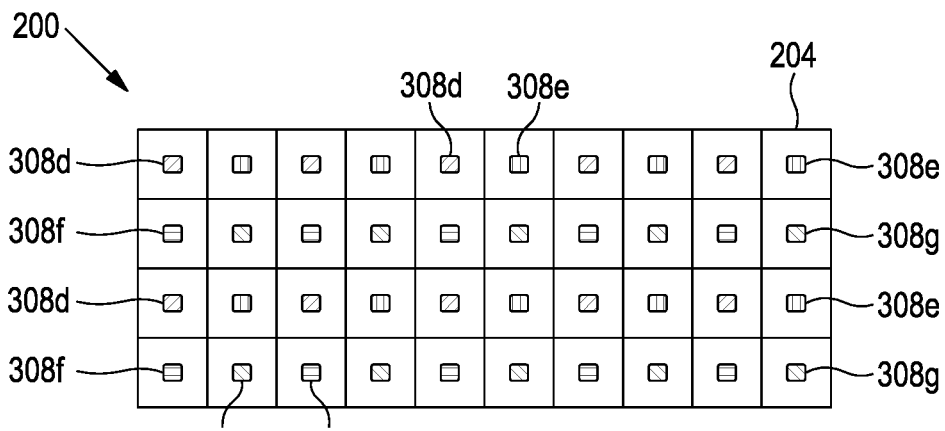

FIGS. 3A and 3B are examples of dynamic, time-varying light patterns including multiple sub-patterns each including a set of dots for sequential illumination of distinct subsets of pixels.

Referring specifically to FIG. 3A, the array 200 of pixels, with macropixels 204 defined therein, can be illuminated sequentially with two sub-patterns, each sub-pattern composed of a respective array of pattern elements 308a, 308b. The arrays of pattern elements 308a, 308b are composed of sets of dots that impinge on alternate sets of rows of the pixel array 200, such that the pattern elements 308a of the first sub-pattern impinge on one set of rows (e.g., the first row and the third row) of the array 200 and the pattern elements 308b of the second sub-pattern impinge on the other set of rows (e.g., the second and fourth rows) of the array 200. In some examples, the first and second sub-patterns 308a, 308b can be generated in an alternating sequence, such that the corresponding rows of the array are activated in an alternating sequence. This alternation can increase, e.g., maximize, the power density of the pattern by concentrating given available power in a single sub-pattern simultaneously. In some examples, the first and second sub-patterns 308a, 308b can be generated simultaneously in order to illuminate all pixels with lower power density compared to concurrent generation of single sub-pattern.

Referring specifically to FIG. 3B, the array 200 of pixels, with macropixels 204 defined therein, is illuminated sequentially with four sub-patterns, each subpattern composed of a respective array of pattern elements 308d, 308e, 308f, 308g. The arrays of pattern elements 308d-308g are composed of sets of dots that impinge each on a corresponding set of macropixels of the pixel array 200. In particular, in the example of FIG. 3B, the pattern elements 308*d* of the first sub-pattern impinge on every other macropixel in a first set of rows (e.g., the first and third rows) of the array. The pattern elements 308*e* of the second sub-pattern impinge on the other macropixels in the first set of rows. The pattern elements 308*f* of the third sub-pattern impinge on every other macropixel in a second set of rows (e.g., the second and fourth rows of the array). The pattern elements 308*g* of the fourth sub-pattern impinge on the other macropixels in the second set of rows. The four sub-patterns 308*d*-308*g* are generated sequentially, and the corresponding macropixels of the array are activated sequentially. In some examples, the sub-patterns 308*d*, 308*e*, 308*f*, 308*g* can be generated in an alternating sequence, such that the corresponding rows of the array are activated in an alternating sequence, in order to increase, e.g., maximize, the power density of the pattern by concentrating given available power in a single sub-pattern simultaneously. In some examples, the sub-patterns 308*d*, 308*e*, 308*f*, 308*g* can be generated simultaneously in order to illuminate all pixels with lower power density compared to concurrent generation of single sub-pattern.

In the examples of FIGS. 2 and 3, the light patterns are composed of uniformly distributed dots. In some examples, the elements of the light patterns can be composed of pattern elements, e.g., dots, that are distributed non-uniformly. In some examples, the non-uniform distribution of pattern elements can be a specifically designed distribution; in some examples, the pattern elements can be distributed randomly.

Figure 4A:
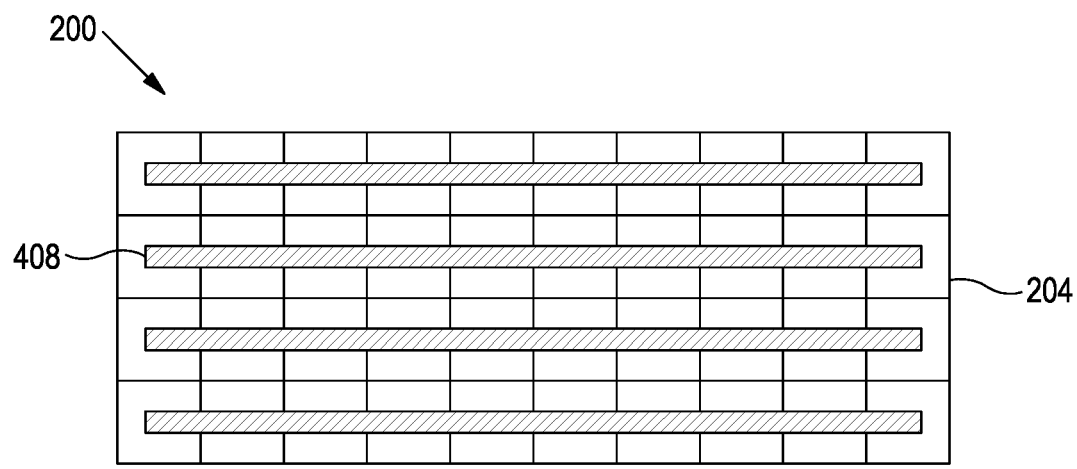
FIGS. 4A and 4B are diagrams of a pixel array of an imaging sensor.
Figure 4B:
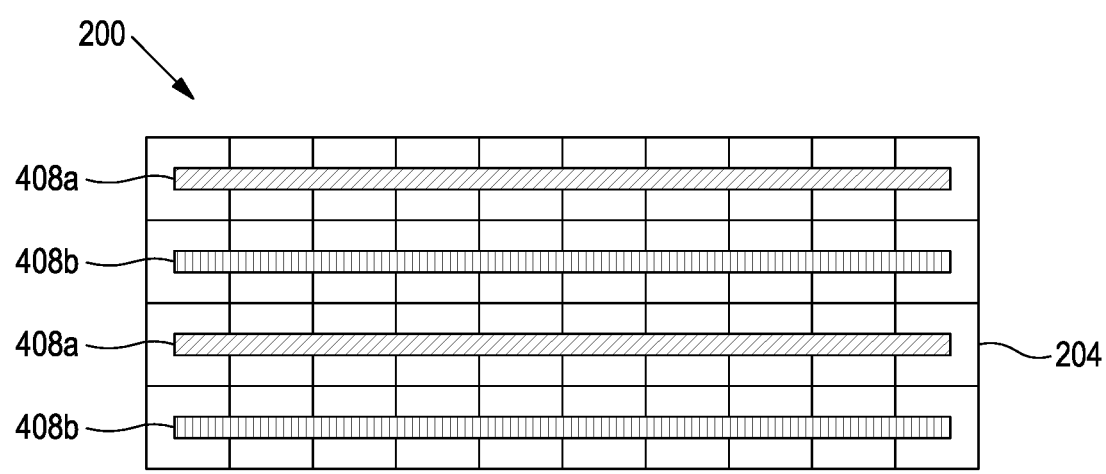

FIGS. 4A and 4B are examples of light patterns in which the pattern elements include lines. Illumination with a set of lines is an extrapolate example of a non-uniform dot pattern, with significantly higher density of illumination dots in a first direction than in a second direction.

Referring specifically to FIG. 4A, in some examples, the light pattern can be composed of a single set of lines 408 that are incident concurrently on the corresponding pixels of the array.

Referring to FIG. 4B, in some examples, the array 200 of pixels can be illuminated sequentially with two sub-patterns, each sub-pattern composed of a respective set of lines 408*a*, 408*b* that impinge on alternate sets of rows of the pixel array 200. The first set of lines 408*a* of the first sub-pattern impinges on one set of rows (e.g., the first row and the third row) of the array 200 and the second set of lines 408*b* of the second sub-pattern impinges on the other set of rows (e.g., the second and fourth rows) of the array 200. In some examples, the first and second sub-patterns 408*a*, 408*b* are generated in an alternating sequence, and the corresponding rows of the array are activated in an alternating sequence, in order to increase, e.g., maximize, the power density of the pattern by concentrating given available power in a single sub-pattern simultaneously. In some examples, the first and second sub-patterns 408*a*, 408*b* can be generated simultaneously in order to illuminate all pixels with lower power density compared to concurrent generation of single sub-pattern.

In some examples, the generation of multiple sub-patterns can be achieved using multiple light sources, e.g., a first set of one or more light sources with associated optical elements for a first sub-pattern and a second, distinct set of one or more light sources with associated optical elements for a second sub-pattern. In some examples, the generation of multiple sub-patterns can be achieved using segmented light sources.

In some examples, the illumination pattern can be composed of multiple sub-patterns that are complementary to one another such that the combination of all of the sub-patterns results in the equivalent of uniform illumination across the entire pixel array. Such sub-patterns are referred to as complementary sub-patterns. Illumination with complementary sub-patterns can be used, e.g., for the generation of a dense depth map (e.g., a high resolution 3D representation) of the environment, e.g., while maintaining the distance accuracy and high signal-to-noise ratio offered by the use of sequential, sparse light patterns.

FIGS. 5A-5D are examples of complementary sub-patterns. With sequential illumination by the complementary, sparse sub-patterns of FIGS. 5A-5D, the entirety of the pixel array 200 can be illuminated, e.g., by an equivalent to flood illumination.

Each sub-pattern is composed of a respective array of pattern elements 508*a*-508*d*. The array of pattern elements for each sub-pattern are composed of blocks of illumination, with the array of pattern elements of each sub-pattern impinging on a corresponding quadrant of the macropixels 204 of the pixel array 200. For instance, the pattern elements 508*a* of the first sub-pattern (FIG. 5A) impinge on the upper left quadrant of each macropixel 204. The pattern elements 508*b* of the second sub-pattern (FIG. 5B) impinge on the upper right quadrant of each macropixel 204. The pattern elements 508*c* of the third sub-pattern (FIG. 5C) impinge on the lower left quadrant of each macropixel 204. The pattern elements 508*d* of the fourth sub-pattern (FIG. 5D) impinge on the lower right quadrant of each macropixel 204.

In total, the pattern elements 508*a*-508*d* of the set of four complementary sub-patterns span the entirety of the pixel array 200, meaning that through a sequence of illumination by all four sub-patterns, all of the pixels of the pixel array 200 are active. The combination of the signals resulting from the four sub-patterns enables generation of a high resolution image having data from all pixels in the pixel array, e.g., a dense depth map of the environment being imaged.

In some examples, a multi-step image process can be implemented in which the environment is initially illuminated by a sparse light pattern (or multiple sparse sub-patterns) followed by illumination by a set of complementary sub-patterns. For instance, the sparse illumination can be used to detect the presence of an object of interest in the field of view of the sensor. When an object of interest is detected, the environment can be illuminated with a set of complementary sub-patterns for generation of a higher resolution dense depth map, e.g., a 3D representation of the object. Such a multi-step process can contribute to power conservation, e.g., in that higher power illumination is used only when there is an indication that an object of interest is present in the environment.

Figure 6A:
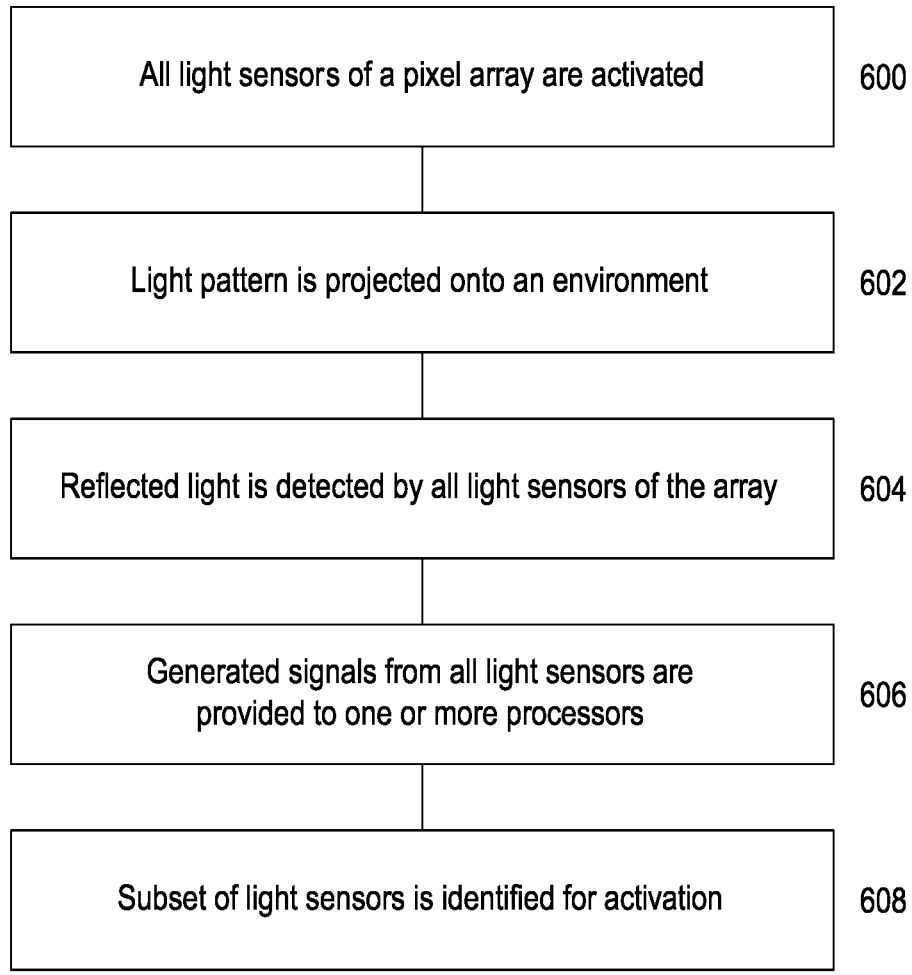
FIGS. 6A and 6B are flow charts.

Referring to FIG. 6A, in an example approach to calibrating a pixel array of a time-of-flight sensor, all light sensors of the pixel array are activated (600). A light pattern is projected from a light source (602). Light reflected from an environment is detected by all light sensors of the pixel array (604), and a signal is generated by each of the light sensors. The generated signals are provided to one or more processors (606), and a subset of the light sensors are identified for activation based on the generated signals (608). The identified subset of light sensors can be stored, e.g., to avoid having to carry out a calibration process for every use of the time-of-flight sensor.

Figure 6B:
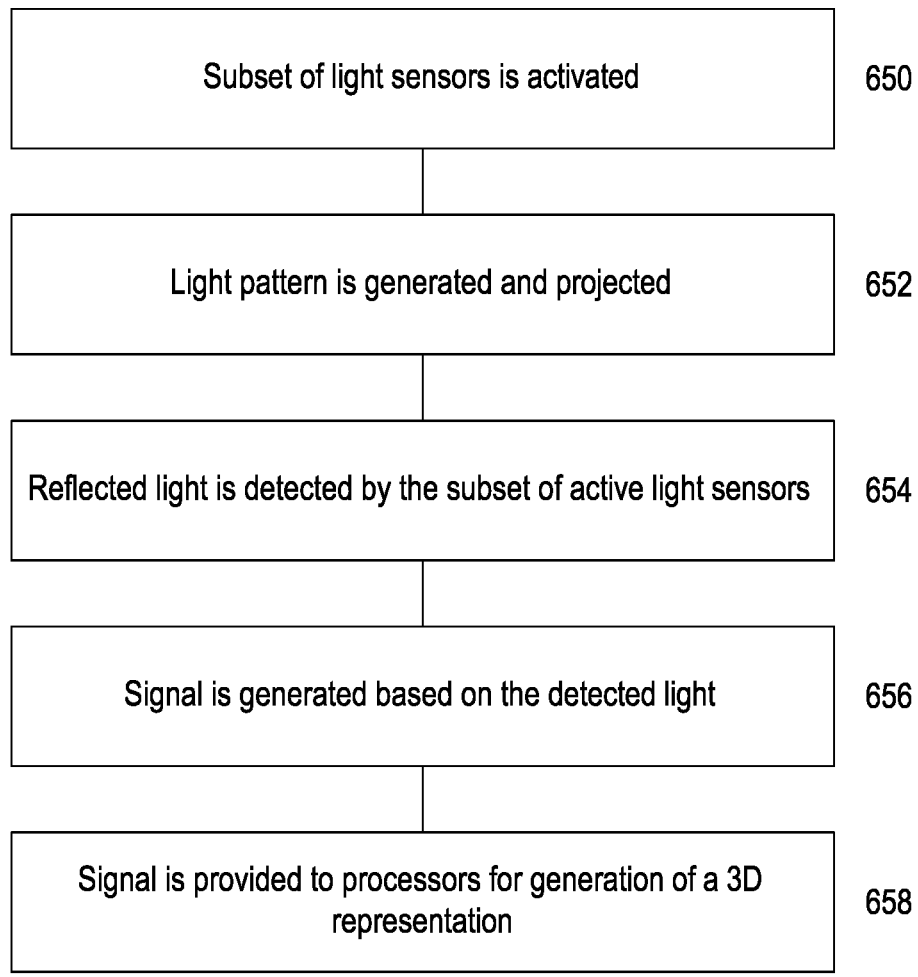

Referring to FIG. 6B, in an example approach to operating a time-of-flight sensor of a time-of-flight sensor system, a subset of light sensors of an array of light sensors of the time-of-flight sensor is activated (650). For instance, the array of light sensors can be grouped into macropixels, each macropixel including one or more of the activated light sensors.

A light pattern is generated (652), e.g., using a multiple emitter or a segmented emitter, or using one or more of a diffractive element, a patterned mark, a micro-lens array, and direct projection. The light pattern is projected onto an environment.

Light reflected from an object in the environment of the sensor system is detected by the activated subset of the light sensors (654). A signal is generated based on the detected light (656). In some examples, when the array of light sensors is grouped into macropixels, a signal is generated for each macropixel based on the light detected by the activated subset of the light sensors of the macropixel. For instance, the light signal can be integrated over all of the light sensors of the macropixel.

The generated signal is provided to one or more processors for generation of a representation, e.g., a 3D image, of the environment (658).

Figure 7:
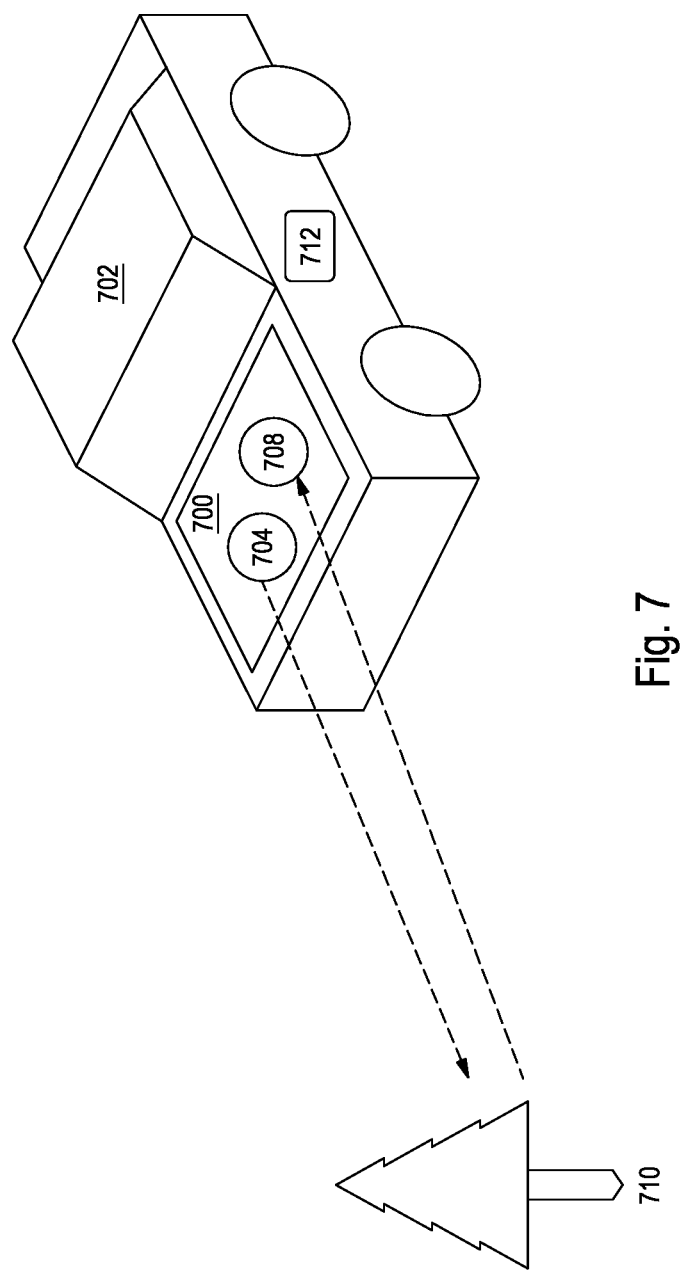
FIG. 7 is a diagram of a 3D sensor system integrated with a vehicle.

Referring to FIG. 7, in some examples, a 3D sensor system 700 employing 3D sensors such as those described here can be incorporated into a vehicle 702, such as a partially-autonomous or fully-autonomous vehicle. The vehicle can be a land-based vehicle (as shown), such as a car or truck; an aerial vehicle, such as an unmanned aerial vehicle; or a water-based vehicle, such as a ship or submarine. The 3D sensor system 700 includes an illumination device 704 and imaging components including an imaging sensor 708. The 3D sensor system 700 can be used, e.g., for 3D mapping of the environment of the vehicle 702. For instance, the 3D sensor system 700 can be used to generate a 3D image of an object 710, e.g., an object in or near a roadway on which the vehicle 702. By determining the 3D shapes of various objects, a mapping of an environment of the vehicle can be determined and used to control the partially- or fully-autonomous operation of the vehicle 702, e.g., by a computing device 712 including one or more processors.

Figure 8A:
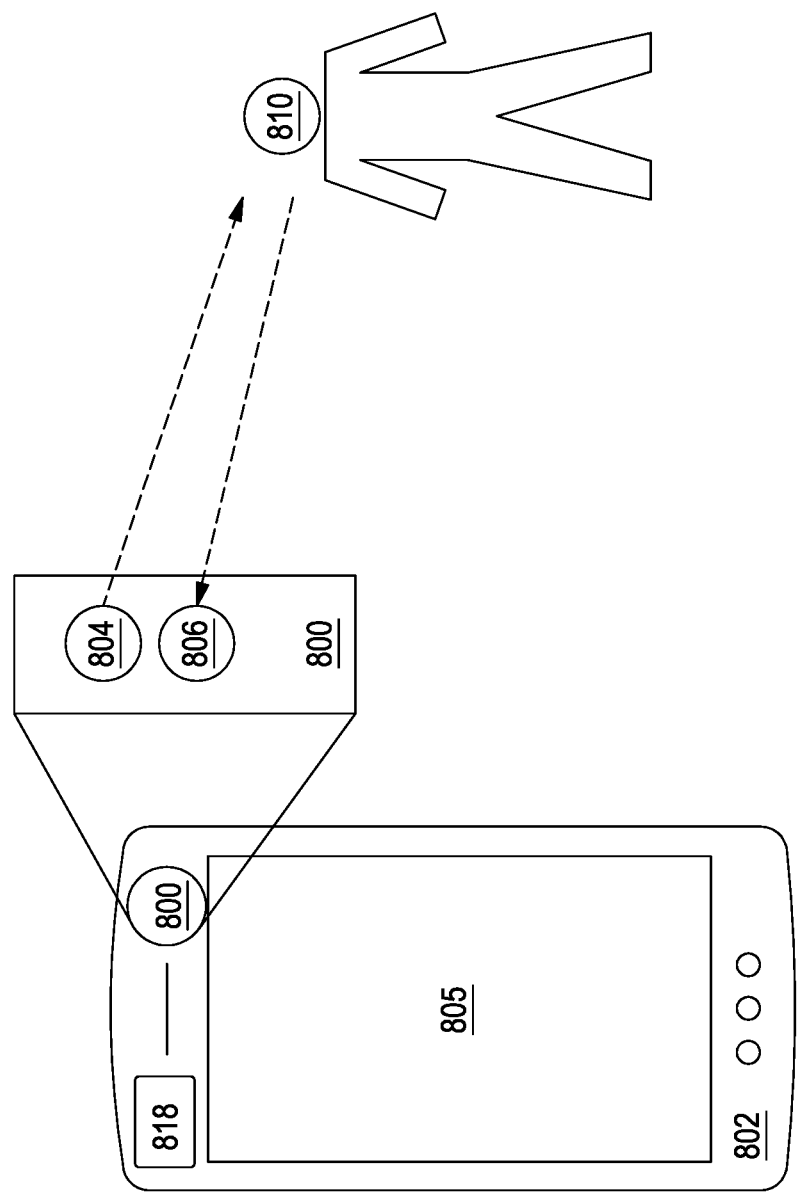
FIGS. 8A and 8B are diagrams of 3D sensor systems integrated with a mobile computing device.
Figure 8B:
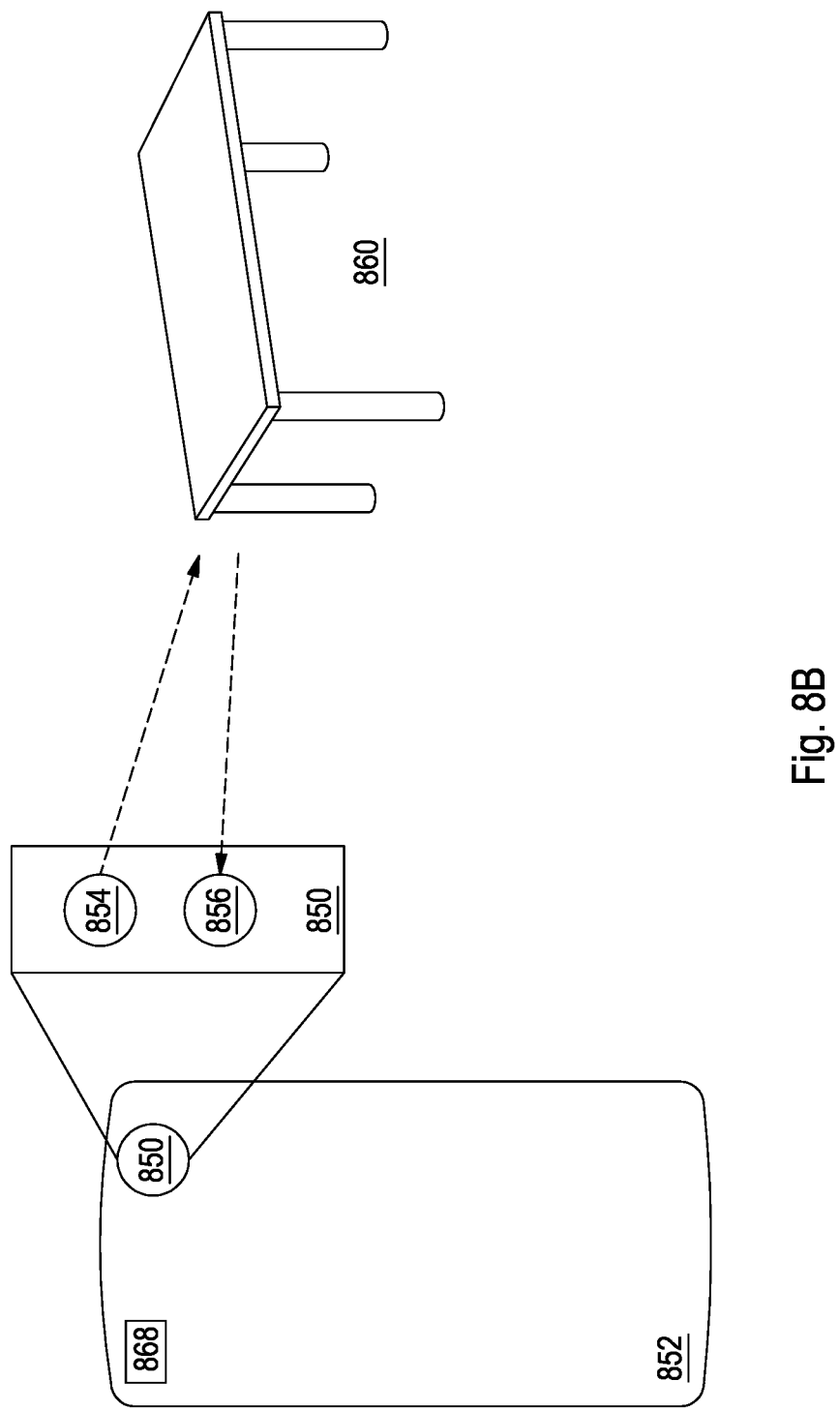

FIGS. 8A and 8B are time-of-flight systems 800, 850 integrated with a mobile computing device 802, 852.

Referring to FIG. 8A, in some examples, a 3D sensor system 800 employing 3D sensors such as those described here can be mounted on or incorporated into a front side of a mobile computing device 802, such as a mobile phone, a tablet, or a wearable computing device. The front side of the mobile device 802 is the side of the device that includes a screen 805. The 3D sensor system 800 can be a front-side imaging system that includes an illumination device 804 and imaging components including an imaging sensor 806. The front side 3D sensor system 800 can be used for 3D imaging applications, e.g., for facial recognition. For instance, the front side 3D sensor system 800 can be used to generate an image of a user's face 810, e.g., for facial recognition processing, e.g., by one or more processors 818 of the mobile computing device 802.

Referring to FIG. 8B, in some examples, a 3D sensor system 850 employing 3D sensors such as those described here can be mounted on a back side of a mobile computing device 852. The back side is the side of the device opposite the front side, such as the side that does not include a screen. The 3D sensor system 850 can be a back-side imaging system that includes an illumination device 854 and imaging components including an imaging sensor 856. The back-side 3D sensor system 850 can be used, e.g., for object recognition or for environmental mapping, such as mapping of a room 860, e.g., by one or more processors 868.

3D imaging systems employing 3D sensors such as those described here can be incorporated into other devices, including game consoles, distance measuring devices, surveillance devices, and other devices.

A number of embodiments of the invention have been described. Nevertheless, it will be understood that various modifications may be made without departing from the spirit and scope of the invention. Accordingly, other embodiments are within the scope of the following claims.

What is claimed is:

1. A method of operating a time-of-flight system having an illumination source and a time-of-flight sensor, the time-of-flight sensor comprising an array of light sensors, the method comprising:
   receiving calibration information regarding an identified subset of light sensors in the array of light sensors;
   activating the identified subset of light sensors;
   projecting a projected light pattern from the illumination source into an environment, wherein the projected light pattern comprises a plurality of dynamically generated sub-patterns,
   wherein each sub-pattern impinges on a different illuminated subset of light sensors,
   wherein the dynamically generated sub-patterns are generated based at least in part on the calibration information, and
   wherein the calibration information comprises a plurality of macropixel definitions that are based on an alignment with a corresponding element of an illumination spot in a previously detected light pattern;
   detecting, by the different illuminated subset of light sensors, a detected light pattern reflected by an object in the environment; and
   generating a representation signal based on the detected light pattern by the different illuminated subset of light sensors, wherein the different illuminated subset of light sensors comprises fewer than all of the light sensors in the array of light sensors, and the representation signal being provided to one or more processors for generation of a representation of the environment.

2. The method of claim 1, wherein the identified subset of light sensors comprises multiple subsets of light sensors in the array of light sensors.

3. The method of claim 2, comprising disabling non-activated light sensors in the array of light sensors that are not included in the identified subset.

4. The method of claim 3, wherein the array of light sensors is grouped into macropixels, each macropixel including one or more of the activated light sensors and the non-activated light sensors, wherein activating the identified subset of light sensors comprises sequentially activating sequential subsets of light sensors in different macropixels.

5. The method of claim 4, comprising activating each subset of the sequential subsets based on a corresponding device light pattern generated by an illumination device.

6. The method of claim 5, wherein activating the identified subset of the light sensors in the array of light sensors comprises sequentially activating each of the multiple subsets of light sensors in the array of light sensors.

7. The method of claim 6, comprising activating a macropixel subset of the identified subset of the light sensors within each macropixel based on the corresponding light pattern from the illumination device, wherein the array of light sensors is grouped into macropixels, each macropixel including one or more of the activated light sensors.

8. The method of claim 6, wherein sequential activation of each of the multiple subsets of light sensors causes activation of all of the light sensors of the array of light sensors.

9. The method of claim 2, wherein the array of light sensors is grouped into macropixels, each macropixel including one or more activated light sensors in the identified subset, and in which generating the signal further comprises generating a macropixel signal corresponding to each macropixel based on the light detected by the activated light sensors of each macropixel.

10. The method of claim 9, in which generating the macropixel signal corresponding to each macropixel comprises integrating a light signal based on light detected by the activated light sensors of the macropixel over at least some of the light sensors of the macropixel.

11. The method of claim 9, comprising defining the macropixels based on light detected by the array of light sensors.

12. The method of claim 1, in which projecting the projected light pattern comprises sequentially projecting multiple distinct light patterns from the illumination source.

13. The method of claim 12, in which the multiple distinct light patterns together correspond to flood illumination of the environment.

14. The method of claim 1, in which projecting the projected light pattern comprises projecting multiple light patterns using a multiple emitter or a segmented emitter.

15. The method of claim 14, comprising generating the projected light pattern by at least one of a diffractive element, a patterned mask, a micro-lens array, and direct projection.

16. The method of claim 1, wherein the dynamically generated sub-patterns are sequentially emitted.

17. The method of claim 1, further comprising calibrating the array of light sensors, wherein identifying the identified subset of light sensors for activation comprises identifying threshold light sensors that detect light having an intensity exceeding a threshold.

18. A time of flight sensor for a time-of-flight sensor system comprising:

an illumination source configured to project a light pattern into an environment;

an array of light sensors each configured to detect light reflected from an object in the environment; and control circuitry configured to:

activate a subset of the light sensors of the array of light sensors based on the light pattern wherein the subset comprises fewer than all of the light sensors of the array;

project a projected light pattern from the illumination source into an environment, wherein the projected light pattern comprises a plurality of dynamically generated sub-patterns, wherein each sub-pattern impinges on a different illuminated subset of light sensors, wherein the dynamically generated sub-patterns are generated based at least in part on calibration information associated with the time of flight sensor, and wherein the calibration information comprises a plurality of macropixel definitions that are based on an alignment with a corresponding element of an illumination spot in a previously detected light pattern;

detect, by the different illuminated subset of light sensors, a detected light pattern reflected by an object in the environment;

receive signals from the different illuminated subset of light sensors, the received signals indicative of detection of light reflected from the object in the environment; and generate an output signal based on the received signals indicative of detection of light, the output signals being provided to one or more processors for generation of a three-dimensional image of the environment.

19. The time of flight sensor of claim 18, comprising at least one of a diffractive element, a patterned mark, and a micro-lens array configured to generate the light pattern.

* * * * *